(12) United States Patent
Gibart et al.

(10) Patent No.: US 7,366,774 B2
(45) Date of Patent: Apr. 29, 2008

(54) NETWORK DELAY MONITOR FOR SAFETY CONTROL NETWORKS

(75) Inventors: Anthony Gerard Gibart, New Berlin, WI (US); David A. Vasko, Macedonia, OH (US); Paul G. Kucharski, Waukesha, WI (US); Joseph A. Lenner, Hudson, OH (US); Edward C. Korsberg, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 756 days.

(21) Appl. No.: 10/357,184

(22) Filed: Jan. 31, 2003

(65) Prior Publication Data

US 2004/0153534 A1 Aug. 5, 2004

(51) Int. Cl.
*G06F 15/173* (2006.01)
*G06F 11/00* (2006.01)

(52) U.S. Cl. ............... 709/224; 370/253; 370/522; 370/13; 370/14

(58) Field of Classification Search ........ 709/223–225; 370/516, 252; 710/52; 713/401
See application file for complete search history.

(56) References Cited

U.S. PATENT DOCUMENTS

| 5,612,949 | A | * | 3/1997 | Bennett | 370/253 |
| 6,175,872 | B1 | * | 1/2001 | Neumann et al. | 709/231 |
| 6,360,271 | B1 | * | 3/2002 | Schuster et al. | 709/231 |
| 6,363,056 | B1 | * | 3/2002 | Beigi et al. | 370/252 |
| 6,512,761 | B1 | * | 1/2003 | Schuster et al. | 370/352 |
| 2002/0061012 | A1 | * | 5/2002 | Thi et al. | 370/352 |
| 2004/0146056 | A1 | * | 7/2004 | Martin | 370/401 |

* cited by examiner

*Primary Examiner*—David Wiley
*Assistant Examiner*—Jude J Jean-Gilles
(74) *Attorney, Agent, or Firm*—Keith M. Baxter; R. Scott Speroff

(57) ABSTRACT

A high reliability network provides for measurements of network delays through pairs of transmissions of local clock values used in a first message to deduce clock value offsets and in a second message to reveal network delays.

26 Claims, 3 Drawing Sheets

NETWORK DELAY MONITOR FOR SAFETY CONTROL NETWORKS

BACKGROUND OF THE INVENTION

The present invention relates to industrial controllers used for real time control of industrial processes, and in particular, to a high reliability industrial controller appropriate for use in devices intended to protect human life and health.

Industrial controllers are special purpose computers used in controlling industrial processes. Under the direction of a stored control program, an industrial controller examines a series of inputs reflecting the status of the controlled process and changes a series of outputs controlling the controlled process. The inputs and outputs may be binary, that is, on or off, or analog providing a value within a continuous range. The inputs may be obtained from sensors attached to the controlled equipment and the output may be signals to actuators on the controlled equipment.

"Safety systems" are systems intended to ensure the safety of humans working in the environment of an industrial process. Such systems may include but are not limited to the electronics associated with emergency stop buttons, interlock switches, and machine lockouts.

Safety systems were originally implemented by hard-wired safety relays but may now be constructed using a special class of high reliability industrial controllers. "High reliability" refers generally to systems that guard against the propagation of erroneous data or signals to a predetermined high level of probability (defined by safety certification standards) by detecting error or fault conditions and signaling their occurrence and/or entering into a predetermined fault "safety" state. High reliability systems may be distinguished from high availability systems, however, the present invention may be useful in both such systems and therefore, as used herein, high reliability should not be considered to exclude high availability systems.

Standard high-speed communication networks are frequently used to join the various components of an ordinary industrial control system that may extend throughout a factory. The protocols used in such standard networks, however, are not adequate for high reliability industrial controllers used for safety systems. In particular, such network protocols may not ensure that communication delay ("data age") is limited or provide a method of monitoring such communication delays.

Modifying standard network protocols to allow monitoring of data age is difficult because standard network interface circuits (NICs) do not normally provide high-level access to network timing information, for example the time of arrival and transmission of messages. Further, precise, synchronized clocks that allow simple timing of data transmission times, are not normally available in the communicating components.

Watchdog timers, operating at the receiving end of the transmission, have been used to monitor network delay with respect to known periodic transmissions. The watchdog ensures that the delay between successive transmissions is not too long. Unfortunately, such watchdog systems do not provide protection against slow increases in the age of the data over time.

SUMMARY OF THE INVENTION

The present invention provides a method of monitoring data age in a standard communications network. In the invention, possibly unsynchronized clocks at the receiving and transmitting nodes exchange messages indicating local time when the message is passed to the NIC for transmission. The exchanged messages allow an offset between the clocks of each node to be determined, and this in turn allows time stamped messages to reveal the network delays. The protocol may operate on demand, as determined by a ping message, and thus can be tailored to have low adverse impact on network bandwidth.

Specifically, the present invention provides a method of detecting excessive network delay in a highly reliable communications system composed of a network, where the network carries messages between at least a first and second node having first and second clocks, respectively. The method includes the step of transmitting a current first time of the first clock over the network from the first node to the second node. The first time is compared to a current second time of the second clock when the first time value is received at the second node to deduce an offset. This offset is transmitted with a current third time of the second clock over the network from the second node to the first node. A comparison of the offset and current third time to a current fourth time of the first clock when the message is received at the first node reveals a network delay value.

Thus, it is one object of the invention to provide a method of tracking network delays without the need for precisely synchronized clocks between nodes. The first message provides an indication of the offset between the clocks, and the reply message provides an indication of the network delay.

It is another object of the invention to provide a method that does not require instantaneous reply to a message. The system of the present invention allows an arbitrary delay between the transmission of the first message and the second message without interference with the measurement of network delay.

The method may include the step of periodically transmitting a ping from the second node to the first node and the step of sending the current first time of the first clock may be triggered by this ping.

Thus, it is another object of the invention to allow control of the measurement of network delay from a single node.

The second node may send data messages to the first node at no less than a first rate and the ping may be a count value incremented at less than the first rate. The step of sending the current first time of the first clock may be triggered only by a change in the ping count.

Thus, it is another object of the invention to separate the measurement of network delay from the transmission rate of other network messages to minimize the burden on the network bandwidth when network delay changes at a low rate.

The calculation of the offset may be used for multiple transmissions of the offset and a current third time to permit multiple comparisons of the offset to a current fourth time.

Thus, it is another object of the invention to further minimize network traffic by reusing the offset value thereby eliminating unnecessary repetitions of the first message.

The step of periodically transmitting a ping to the first node may also transmit the ping to additional first nodes and each of the first nodes may be triggered to transmit a current first time of their respective clocks to the second node.

Thus, it is another object of the invention to provide for a system that may be used in a multicasting environment.

The method may include the step of transmitting a second offset approximating a current difference between the first and second clocks at the time of transmission of the current first time of the first clock. The further step of comparing the second offset and the current third time to reveal a network delay may be added.

Thus, it is another object of the invention to provide for monitoring of network delays in two directions (in a bi-directional communication system) without the need for duplicate messages.

These particular objects and advantages may apply to only some embodiments falling within the claims and thus do not define the scope of the invention.

DETAILED DESCRIPTION OF THE PREFERRED EMBODIMENT

The present invention can be part of a "safety system" used to protect human life and limb in the industrial environment. Nevertheless, the term "safety" as used herein is not a representation that the present invention will make an industrial process safe or that other systems will produce unsafe operation. Safety in an industrial process depends on a wide variety of factors outside the scope of the present invention, including: design of the safety system, installation, and maintenance of the components of the safety system, and cooperation and training of individuals using the safety system. Although the present invention is intended to be highly reliable, all physical systems are susceptible to failure and provision must be made for such failure.

Network Architecture

Figure 1:
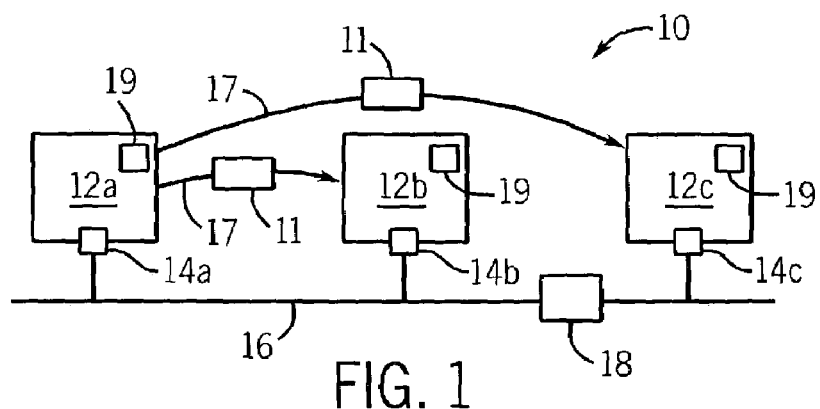
FIG. 1 is a schematic representation of a network that may be used in the present invention.

Referring now to FIG. 1, a highly reliable control system 10 may include a number of nodes 12(a), 12(b) and 12(c) comprising, for example, a programmable logic controller (PLC) and various input or output modules or the like. Each of the nodes 12(a) through 12(c) may communicate via a standard network interface circuit (NIC) 14(a) through 14(c), respectively, with a network 16. Using a network protocol, a series of logical connections 17 may be established between the nodes 12(a) through 12(c) on which messages 11 may be communicated. The connections may reserve bandwidth and buffer space on a producer/consumer pair, which identify connections by a connection identifier incorporated into the messages 11. Multiple independent connections can be established between a single pair of physical devices.

The network 16 may be, but is not limited to, one or more standard networks intercommunicating via bridge 18 such as Ethernet, DeviceNet, ControlNet, Firewire, or FieldBus. The network is generally a high-speed serial network using single or multiple conductor copper media but may include fiber optic, wireless communication technology or other well-known alternatives. While an external network 16 is shown, the network 16 may be employed as a backplane or the like within a housing.

The nodes 12(a) through 12(c) generally include a processor executing portions of a control program and a safety protocol. The nodes 12(a) through 12(c) also include asynchronous local clocks 19 providing time values to the processor.

Logical Network Elements

Figure 2:
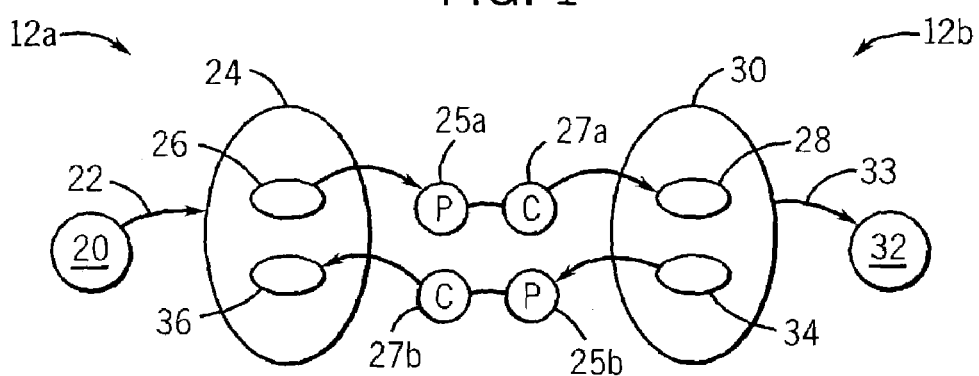
FIG. 2 is a flow diagram showing logical paths of messages in a single or bi-directional message transmission.

Referring now to FIG. 2, a producer safety application 20, being part of the safety protocol running on a processor on node 12(a), may provide a message 22 to a safety client 24, also being a program executed in the node 12(a). The safety client 24 in turn implements a safety message originator 26 which receives the message 22 and formats it to incorporate additional safety aspects, such as, by adding of error detecting codes and data redundancy to the message. For example, the safety message originator 26 may combine the message 22 with an inverted copy of the message 22. The safety message originator 26 then communicates the message to the producer 25a.

Producer 25a manages lower level transmission protocols dependent on the particular network 16 including, for example, the addition of a connection identifier as will be described. The producer 25a may manage other aspects the logical connections 17 depending on the network 16 as will be understood in the art.

Referring still to FIG. 2, the producer 25a may transmit a message 11 on the network 16 that is received by a consumer 27a, which extracts a message and forwards it to safety message receiver 28 within a safety server 30 being implemented in software in node 12b. The safety message receiver 28 provides a message 33 to a consumer safety application 32 also implemented as software in node 12b.

Generally the consumer safety application 32 and the producer safety application 20 are specific to the control program implemented by the highly reliable control system 10 and will vary from application to application as is understood in the art.

FIG. 2 may also be used to illustrate a bi-directional communication mode where safety message originator 26 operates both as a safety message originator and safety acknowledgment consumer and each of safety receiver 28 and safety acknowledgment producer 34 and safety acknowledgment consumer 36 similarly, all do double duty so as to handle bi-directional flow of messages.

Figure 3:
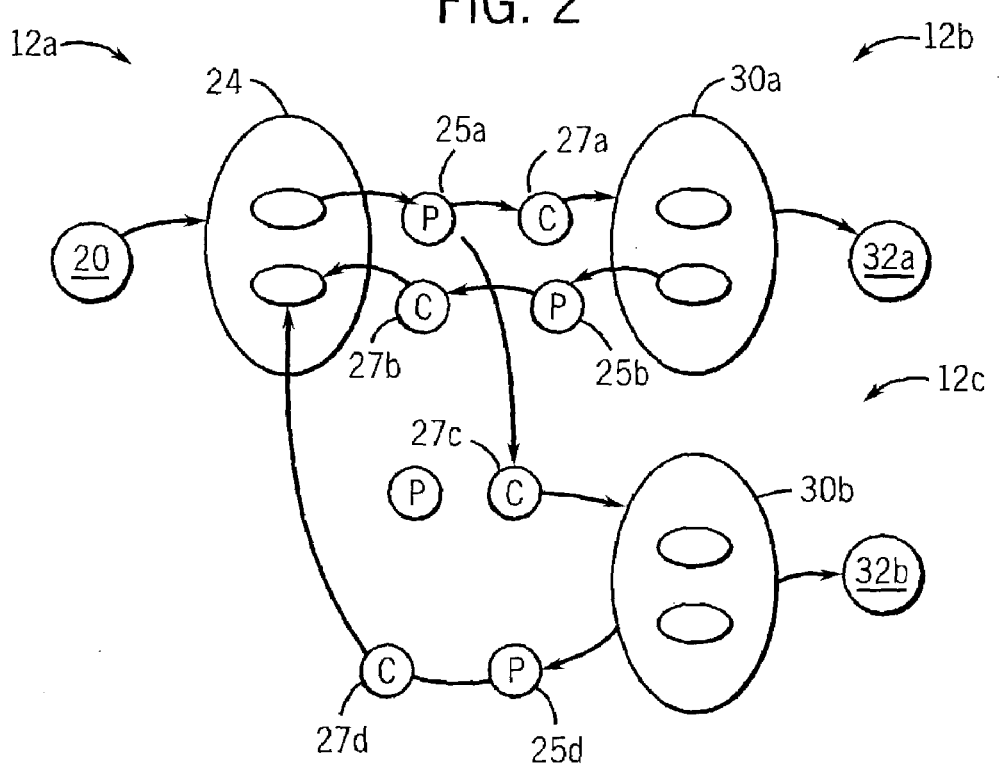
FIG. 3 is a figure similar to that of FIG. 2 showing a multicast message.

Referring now to FIG. 3, the present invention may be also useful for multicasting situations where producer safety application 20 provides a message 22 to the safety client 24, which sends a message on producer 25a to multiple consumers 27a and 27c. The consumers 27a and 27c communicate, respectively, with two safety servers 30a and 30b such as may be implemented in separate nodes 12b and 12c.

These logical elements may be distributed functionally among the hardware elements described previously as will be well understood in the art.

Data Age Monitoring

Figure 4:
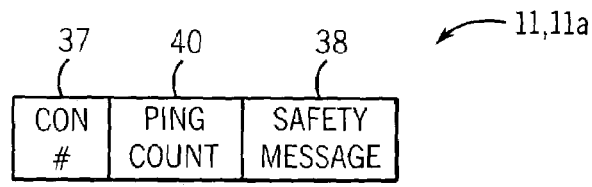
FIG. 4 is a diagram of a standard message having a ping count which may be used to trigger the data aging measurement of the present invention.
Figure 6:
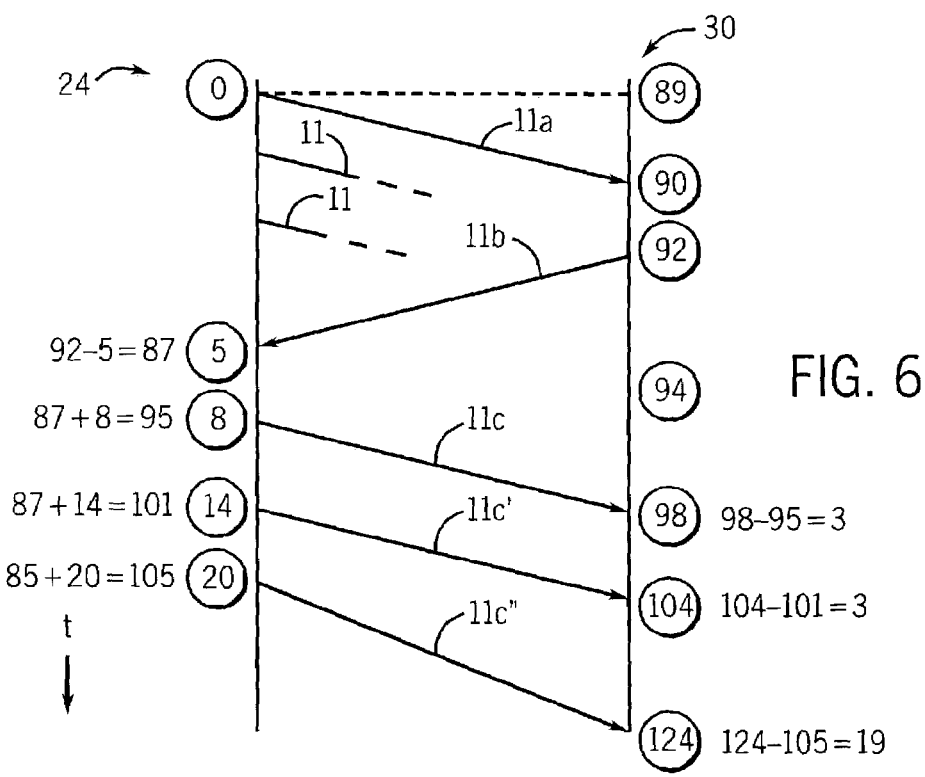
FIG. 6 is a chart having a vertical axis of time and showing the flow of timing messages between a producer and consumer used in the calculation of network delay and showing excessive delay in one producer message.

Referring now also to FIGS. 4 and 6, the safety client 24 may communicate with a safety server 30 by sending a number of messages 11 containing data for the operation of the highly reliable control system 10. Each message 11 (shown in FIG. 4) includes a connection identifier 37 identifying the logical connection on which the message is being transmitted. Also included in each message is safety data 38 being generally control related data specific to the producer safety applications 20 and consumer safety application 32 combined, typically, with additional safety features such as an error detection code beyond that added by the network protocol and possibly a redundant copy of the safety data 38 in inverted form.

The messages 11 also include a ping count 40 which is a number slowly incremented over time, typically at a rate far below the highest rate of message transmissions of messages 11. An initiation message 11a in which the ping count 40 has been incremented over the previous message 11 (but which is in other ways a standard message 11) may be transmitted (as shown in FIG. 6) between the safety client 24 and safety server 30 to trigger the updating of clock correction factors used in the measurement of data aging on the network 16.

Figure 5A:
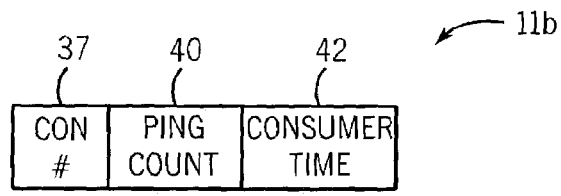
FIGS. 5a and 5b are figures similar to FIG. 4 showing an offset measurement message and a delay measurement message, respectively also used in the present invention.

When received, the initiation message 11a causes the safety server 30 to produce a special offset measurement message 11b shown in FIG. 5a. The offset measurement message 11b, like the initiation message 11a, includes a connection identifier 37 and the ping count 40 identical to that of initiation message 11a. However, the offset measurement message 11b further includes a consumer time value 42 that is a current time from a local clock 19 of the acknowledging node 12 holding the safety server 30 at the time of transmission of offset measurement message 11b. The local clock 19 accessible to the safety server 30 will in general not be coordinated with other local clocks 19, for example, of the safety client 24 in time value. In this example, the local clock 19 of the safety server 30 is (89) counts ahead of the local clock 19 of the safety client 24. The frequency of the local clocks 19 are approximately the same over expected periods of data aging and of sufficient resolution to distinguish desired regions within an expected range of data aging of the network 16.

As a practical matter, the consumer time value 42 will be the time at which the offset measurement message 11b is ready for transmission by the network interface circuit 14, not when the offset measurement message 11b is actually transmitted. The network interface circuit 14 will impose a small and variable additional delay in the transmission of the offset measurement message 11b which may be considered part of the data aging.

In the example of FIG. 6, the consumer time value 42, obtained from a local clock 19 running within node 12b, may have a value of (92) at the time of transmission of the offset measurement message 11b. When the offset measurement message 11b is received by the safety client 24, a local clock 19 at that safety client 24 is read, in this case providing a value of (5).

The time required for the transmission of the offset measurement message 11b in this example is approximately two counts but this cannot be determined directly because of the unknown relationship between the local clocks 19. Instead at the safety client 24, the received consumer time value 42 of (92) from the safety server 30 has the local clock value (5) subtracted from it to yield an offset value (87) being the actual offset between the local clocks (89) minus the message transition time (2) of offset measurement message 11b.

Except for the first time in which the offset measurement message 11b is transmitted, the safety client 30 will be able to compare the current offset value to a previously derived offset value. The comparison may be used to detect or discard offset values that deviate greatly from the actual difference between the clocks of the safety client 24 and the safety server 30, for example, because of extraordinary network delay.

One simple method of discarding outlying offset values is to compare the current offset value to a range encompassing the previously adopted offset value modified by the maximum expected drift between the clocks of the safety client 24 and the safety server 30. This maximum expected drift can be a constant value based on the known precision of the clock circuits. If the current offset value is outside the range defined by the previously adopted offset value plus and minus the maximum expected drift, the previously adopted offset value is used.

Figure 5B:
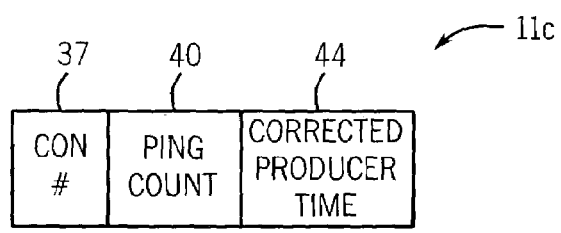

More generally, the previous offset values can be used to plot a trend line that may be used to discard outlying offset values. In this way differences between the clocks of the safety client 24 and the safety server 30 may be more accurately determined, independent of network delay. At some time later after the safety client 24 has received the offset measurement message 11b, for example, when the local clock 19 of the safety client 24 has reached a value of (8), a delay measurement message 11c is transmitted from the safety client 24 to the safety server 30. The delay measurement message 11c, as shown in FIG. 5b, like the initiation message 11a and offset measurement message 11b, includes a connection identifier 37 and the ping count 40 identical to these other messages. However, the delay measurement message 11c also includes a corrected producer time 44, being the current time (8) when the delay measurement message 11c was transmitted from the safety client 24 plus the offset (87), equaling (95).

The combined offset and local clock value of the corrected producer time 44 are received at the safety server 30 at time (98) being a one clock delay in this example. At this point, the transmitted value (95) of the corrected producer time 44 is subtracted from the current time (98) of the local clock 19 at the safety server 30 server to yield a data age of (3). The data age value (3) represents the maximum of the delays incurred in the transmission of the offset measurement message 11b and delay measurement message 11c.

This data age may be compared against a predetermined threshold, for example, the value (15) to initiate a safety state in the safety server 30 when delay in the transmission of messages 11 rises to a level that critically affects the reliability of the high reliability control system 10.

The measurement process may be repeated to provide a semi-continuous measurement of data age. The repetition rate is normally much less than the rate of transmission of messages 11 but sufficient to track more slowly changing data age. Invocation of the messages 11a-11c infrequently, compared to normal message traffic, conserves network bandwidth. Further, when the data age process is invoked, the messages 11a and 11b may be skipped for periods when the frequency drift between local clocks 19 is likely to mean that the offset has not materially changed. Thus, after the transmission of delay measurement message 11c described above, a later delay measurement message 11c' may be transmitted making use of the offset value (87) previously established, without repetition of messages 11*a* and 11*b*.

The second delay measurement message 11*c*' contains a corrected producer time 44 of (101) produced from the sum of the offset value (87) and the current local clock time (14). When this corrected producer time 44 is received by the safety server 30 at local clock time (104), a new data age of (3) may be calculated (104–101=3). Note that the corrected producer time 44 of(101) could be transmitted separately as an offset value and a clock time and the addition done at the safety server 30.

Referring still to FIG. 6, at a later time (20) a third delay measurement message 11*c*" may be sent from the safety client 24 to be received at the safety server 30 at local time (124) using yet the same offset value of (85). As shown, this message is significantly delayed. In this case, a data age of (124)–(105)=(19) is produced, triggering a safety state.

After some number of messages 11 and 11*c* have been transmitted, initiation message 11*a* will again be transmitted, updating the offset between the clocks of the safety client 24 and the safety server 30 in the event of frequency mismatch between those clocks.

Figure 7:
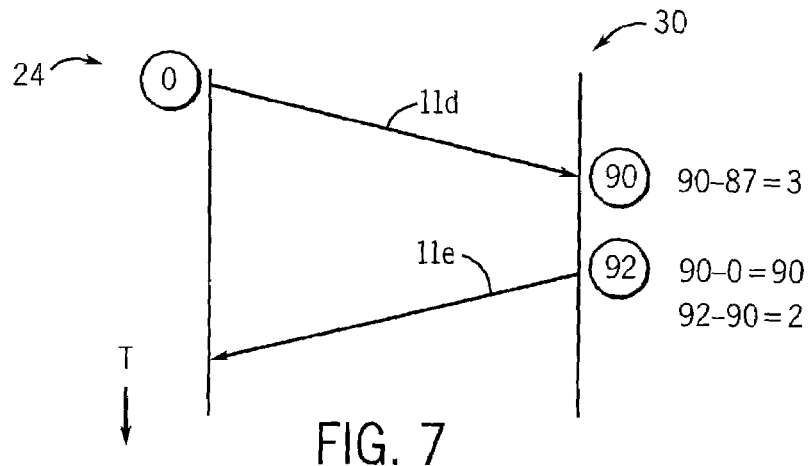
FIG. 7 is a figure similar to FIG. 6 showing excessive delay in one consumer message.
Figure 8:
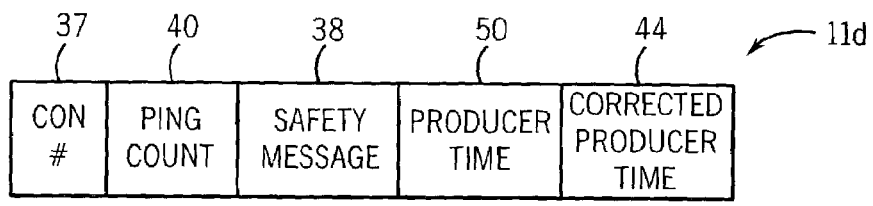
FIG. 8 is a figure similar to that of FIGS. 4 and 5 showing combination of the data of FIGS. 4 and 5 into a single message for use with bi-directional communication systems.

Referring now to FIG. 7, bi-directional measurement of message delay separately from the safety client 24 to safety server 30 and safety server 30 to safety client 24 may occur using a modified offset/delay measuring message 11*d* shown in FIG. 8. In this message, the connection identifier 37, ping count 40, safety data 38 may be similar to that of initiation message 11*a*. However, both a producer time 50 and a corrected producer time 44 may be provided. The producer time 50 is the time of the local clock of the producer at the time the offset/delay measuring message 11*d* is transmitted. The corrected producer time 44 is the producer time 50 plus an offset value between producer and consumer clock previously calculated as will be described.

As shown in FIG. 7, the offset/delay measuring message 11*d* arriving at the safety server 30 may be used to compute a data age using the corrected producer time and the current time of the local clock at the consumer. In this case, for example, the corrected producer time 44 may be (87) and subtracted from the value (90) of the local clock at the consumer to yield a data age (3). At the same time, the producer time 50, being a value of (0) in this example, is subtracted from the local clock at the consumer to yield an offset (90).

Figure 9:
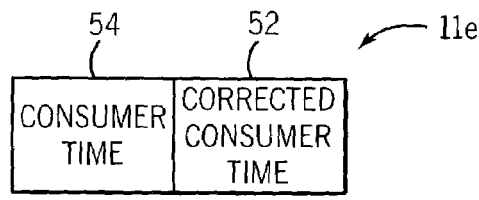
FIG. 9 is a figure similar to FIGS. 6 and 7 showing use of the system in a multicast environment of FIG. 3.

This offset of (90) may, in turn, be communicated in a offset/delay measuring message 11*e* shown in FIG. 9 transmitted from the consumer to the producer and holding corrected consumer time 52, in this case being the current value of the local clock at the consumer of (92) minus the previously computed offset (90), being a value of (2). In this same message, the consumer time 54 of (92) to allow the computation of offset at the producer to be used in a later offset/delay measuring message 11*d* as described above.

In this case, situation, data age values are obtained twice as often.

Figure 10:
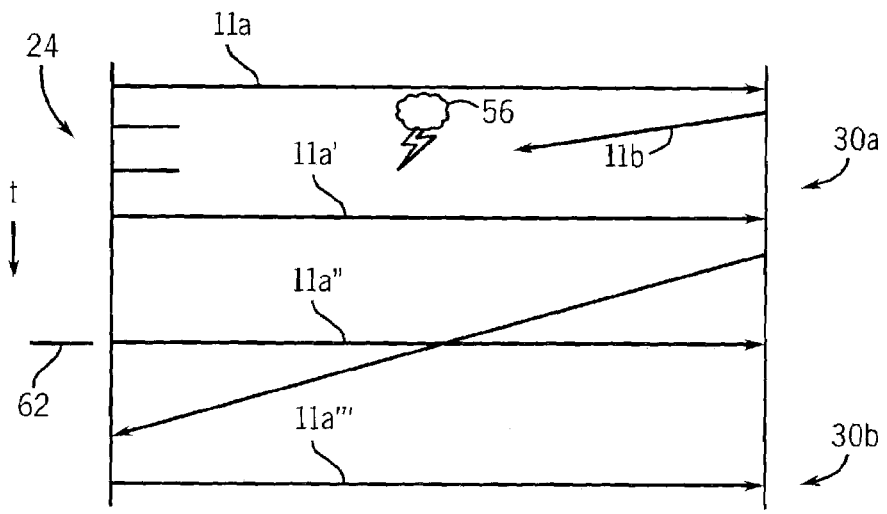
FIG. 10 is a chart similar to FIG. 6 showing a multicast communication.

Referring now to FIG. 10, the present invention may also work in the multicast situation described above with respect to FIG. 3. In this case, the initiation message 11*a*, containing a ping count that has changed, is sent from the safety client 24 to multiple safety servers 30*a* and 30*b*. Each of the safety servers 30*a* and 30*b* may receive the initiation message 11*a* on at the same time or in round-robin fashion prior to changing of the ping count value.

Upon receipt of the initiation message 11*a*, safety servers 30*a*, for example, may attempt to send an offset measurement message 11*b* as described above with respect to FIG. 6. Electrical interference 56 may prevent that message from being received in which case the safety client 24 may be programmed to retry up to a retry limit, additional initiation messages 11*a*. The second initiation message 11*a*' may be interrupted again or may be delayed beyond the retry limit of 62 in which case, initiation message 11(*a*") is transmitted to the safety servers 30*a* indicating a fault state. A similar response to lost and delayed messages is also provided in the above-described examples of single case and bi-directional messages.

Assuming that a safety state is not invoked for the high reliability controller 10, then at a next ping interval, initiation message 11*a*''' is sent to the next safety server 30*b* in round-robin form until all of the safety servers 30*a*, 30*b* have received an initiation messages 11*a* and responded. Typically, each offset measurement message 11*b* provides an offset value that are maintained separately by the safety client 24 for each safety server 30 so that subsequent delay measurement message 11*c*, described above with respect to FIG. 6, may be properly matched to the appropriate offset values.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of detecting excessive network delay in a high reliability communications system composed of a network carrying messages between at least a first and second node, the first and second nodes having first and second unsynchronized clocks respectively, the method comprising the steps of:
    (a) transmitting a current first time of the first clock over the network from the first node to the second node;
    (b) comparing the first time to a current second time of the second clock upon receipt of the first time value, to deduce an offset;
    (c) transmitting, at an arbitrary time after step (a), the offset and a current third time of the second clock over the network from the second node to the first node; and
    (d) comparing the offset and third time to a current fourth time of the first clock to reveal a network delay value.

2. The method of claim 1 wherein at step (c) the offset and current third time are transmitted as a sum and the comparison of step (d) evaluates a difference between the sum and the current fourth time to compute network delay.

3. The method of claim 1 wherein at step (c) the offset and current third time are transmitted as separate values and wherein step (d) sums them and evaluates a difference between the sum and the current fourth time to compute network delay.

4. The method of claim 1 further including the step of periodically transmitting a ping from the second node to the first node and wherein step (a) is triggered by receipt of the ping by the first node.

5. The method of claim 4 wherein the second node sends data messages to the first node at no less than a first rate and wherein the ping is a count value incremented at less than the first rate.

6. The method of claim 5 wherein the step (a) is triggered by a change in the count value of the ping.

7. The method of claim 1 including the step of repeating steps (c) and (d) multiple times for each performance of steps (a) and (b).

8. The method of claim 4 wherein the step of periodically transmitting a ping from the second node, transmits a ping to multiple first nodes, and wherein each of the multiple first nodes is triggered by receipt of the ping to transmit a current first time of a respective first clock of the first nodes over the network to the second node.

9. The method of claim 8 wherein step (b) compares the first times of each of the first nodes to the second time to deduce a corresponding set of offset values for each of the first nodes; and wherein step (c) transmits each offset value and the current third time value to the respective first nodes.

10. The method of claim 1 wherein the network includes one or more networks intercommunicating by means of a network interface device.

11. The method of claim 10 wherein the network interface device is a bridge.

12. A method of detecting excessive network delay in a high reliability communications system composed of a network carrying messages between at least a first and second node, the first and second nodes having first and second unsynchronized clocks respectively, the method comprising the steps of:
 (a) transmitting a current first time of the first clock over the network from the first node to the second node;
 (b) comparing the first time to a current second time of the second clock upon receipt of the first time value, to deduce an offset;
 (c) transmitting the offset and a current third time of the second clock over the network from the second node to the first node;
 (d) comparing the offset and third time to a current fourth time of the first clock to reveal a network delay value; and
 (e) periodically transmitting a ping from the second node to the first node and wherein step (a) is triggered by receipt of the ping by the first node,
 wherein the step of periodically transmitting a ping from the second node, transmits a ping to multiple first nodes, and wherein each of the multiple first nodes is triggered by receipt of the ping to transmit a current first time of a respective first clock of the first nodes over the network to the second node, and
 wherein the second node sends data messages to the first nodes at no less than a first rate and wherein the ping is a count value incremented at less than the first rate.

13. The method of claim 12 wherein the second node transmits a ping to multiple first nodes sequentially and wherein the ping count value is incremented only after each first node has received a ping of a given count value.

14. The method of claim 8 further including the step of (e) comparing the network delay value at each first node to a predetermined threshold to put the first node into a predetermined safety state for a fault if the network delay exceeds the predetermined threshold.

15. The method of claim 8 wherein the step (a) is triggered by a change in the count value of the ping.

16. The method of claim 1 wherein step (a) further includes transmitting a second offset approximating a current difference between the first and second clocks.

17. The method of claim 16 further including the steps of:
 (e) comparing the second offset and the current third time to reveal a network delay value.

18. The method of claim 16 wherein the second offset is deduced from a current time value of the second clock previously sent from the second node to the first node.

19. The method of claim 16 further including the step of periodically transmitting a ping from the second node to the first node and wherein step (a) is triggered by receipt of the ping by the first node.

20. The method of claim 19 wherein the ping includes a current time value of the second clock at the time of transmission of the ping.

21. The method of claim 19 wherein the second node sends data messages to the first node at no less than a first rate and wherein the ping is a count value incremented at less than the first rate.

22. The method of claim 20 wherein the step (a) is triggered by a change in the ping count.

23. The method of claim 16 further including the step of (e) comparing the network delay value to a predetermined threshold to put the first node into a safety state if the network delay exceeds the predetermined threshold.

24. The method of claim 1 further including the step of (e) comparing the network delay value at each first node to a predetermined threshold to put the first node into a predetermined safety state for a fault if the network delay exceeds the predetermined threshold.

25. The method of claim 1 wherein at step (b) further compares the offset to at least one previously determined offset and replaces the offset with the at least one previously determined offset, when based on expected drift between the first and second clocks, the at least one previously determined offset is estimated to be a more accurate representation of the offset between the first and second clocks.

26. The method of claim 25 wherein the comparison compares the offset with a range equal to the at least one previously determined offset plus and minus the expected drift and replaces the offset when the offset is not within the range.

* * * * *